United States Patent
Nirenberg

(10) Patent No.: US 9,073,606 B2
(45) Date of Patent: Jul. 7, 2015

(54) VALVE ASSEMBLY FOR A BILGE PUMP SYSTEM

(71) Applicant: David B. Nirenberg, Bonita Springs, FL (US)

(72) Inventor: David B. Nirenberg, Bonita Springs, FL (US)

(73) Assignee: Lake Red Rock LLC, Ankeny, IA (US)

( * ) Notice: Subject to any disclaimer, the term of this patent is extended or adjusted under 35 U.S.C. 154(b) by 0 days.

(21) Appl. No.: 13/938,035

(22) Filed: Jul. 9, 2013

(65) Prior Publication Data

US 2014/0196651 A1     Jul. 17, 2014

Related U.S. Application Data

(60) Provisional application No. 61/669,341, filed on Jul. 9, 2012.

(51) Int. Cl.
*B63B 17/06* (2006.01)
*F16K 15/04* (2006.01)
*B63J 4/00* (2006.01)

(52) U.S. Cl.
CPC ............... *B63B 17/06* (2013.01); *F16K 15/044* (2013.01); *B63J 4/002* (2013.01)

(58) Field of Classification Search
CPC ........ B63B 13/00; B63B 17/06; B63B 35/73; F16K 15/044
USPC ..................................................... 114/183 R
See application file for complete search history.

(56) References Cited

U.S. PATENT DOCUMENTS

| | | | | |
|---|---|---|---|---|
| 2,674,948 | A | * | 4/1954 | Roof .............................. 417/96 |
| 4,649,952 | A | * | 3/1987 | Jobe ......................... 137/614.16 |
| 4,850,908 | A | * | 7/1989 | Nakase et al. ............ 114/183 R |
| 5,346,369 | A | | 9/1994 | Miller, Jr. |
| 6,056,881 | A | | 5/2000 | Miller et al. |
| 6,572,762 | B2 | | 6/2003 | Maxwell et al. |
| 6,763,775 | B1 | | 7/2004 | Sweeting |
| 7,210,423 | B2 | | 5/2007 | Haugen |
| 7,661,380 | B2 | | 2/2010 | Waldecker |

* cited by examiner

*Primary Examiner* — Lars A Olson
(74) *Attorney, Agent, or Firm* — Porter, Wright, Morris & Arthur, LLP

(57) ABSTRACT

A valve assembly for a bilge pump system having first and second bilge pumps each connected to a single hull outlet includes a valve body having a first inlet port for connection to the first bilge pump, a second inlet port for connection to the second bilge pump, and an outlet port for connection to the hull outlet. A first one-way valve operates at the first inlet port for allowing flow into the first inlet port to the outlet port and preventing flow out of the first inlet port from the second inlet port and/or the outlet port. A second one-way valve operates at the second inlet port for allowing flow into the second inlet port to the outlet port and preventing flow out of the second inlet port from the first inlet port and/or the outlet port. The valve assembly enables the second bilge pump to be connected to the single hull outlet and eliminates the need to cut an additional outlet opening in the hull.

20 Claims, 3 Drawing Sheets

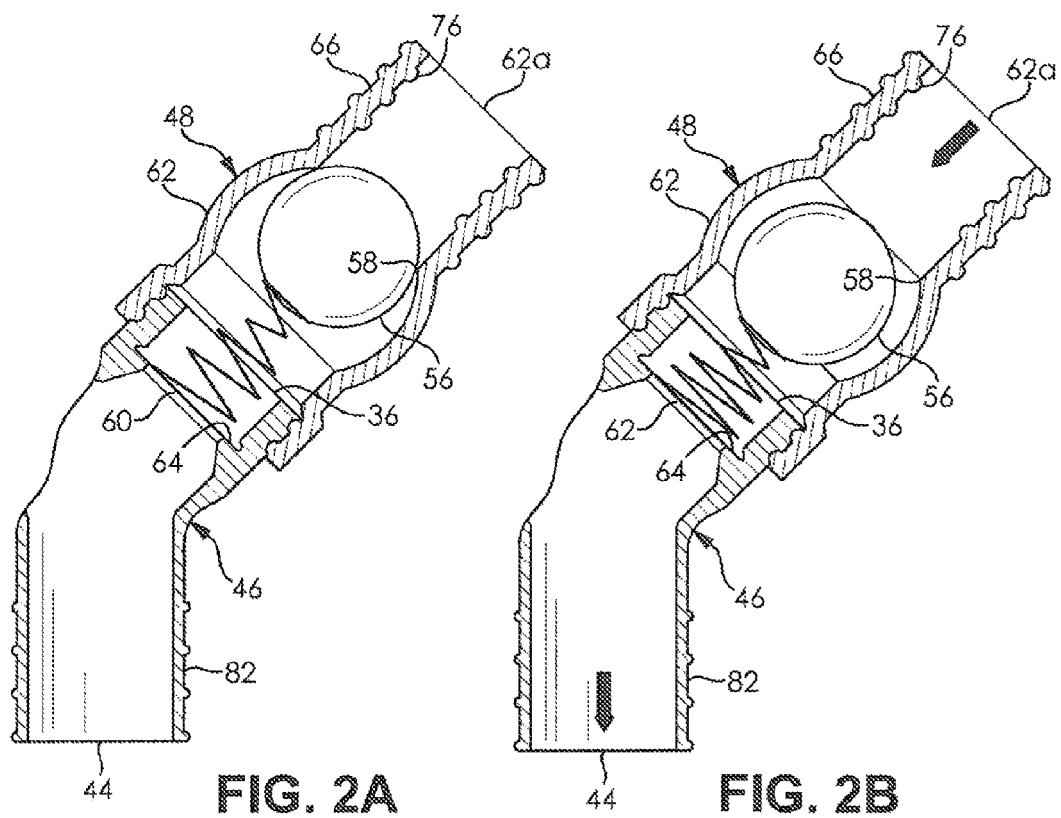
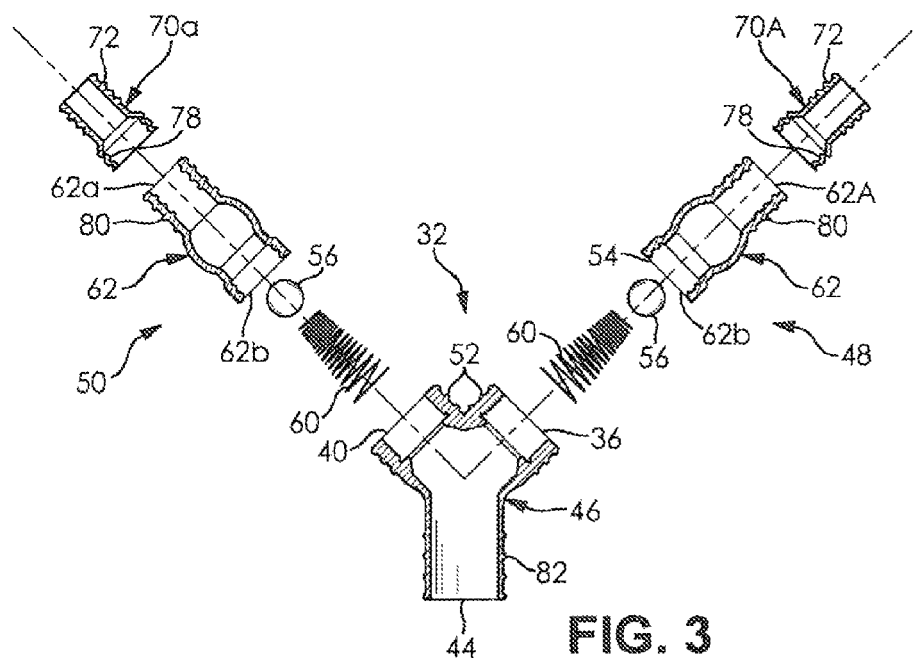

VALVE ASSEMBLY FOR A BILGE PUMP SYSTEM

CROSS-REFERENCE TO RELATED APPLICATIONS

This application claims the priority benefit of U.S. Provisional Patent Application No. 61/669,341 filed on Jul. 9, 2013, the disclosure of which is expressly incorporated herein in its entirety by reference.

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the present invention generally relates to bilge pump systems, and more specifically, to bilge pump systems for watercraft and the like.

BACKGROUND OF THE INVENTION

Watercraft such as boats and ships typically have a bilge with at least one bilge pump located therein that selectively removes unwanted water from the bilge that accumulates in the bilge. The bilge pump must be activated before accumulating water in the bilge reaches an excessive level that could damage or capsize the watercraft. The bilge pump can be activated manually or by depth switches or sensors that automatically activate the bilge pump when the water level in the bilge reaches a predetermined level. The bilge pump typically has an outlet that is connected by a bilge hose to a outlet port in a hull of the watercraft. Configured in this manner, the bilge pump system removes water in the bilge through the hull outlet port.

While these prior bilge pump systems generally remove bilge water in a suitable manner, in some instances it is desirable to add an additional, supplemental, or back-up bilge pump. For example, in watercraft requiring a relatively large bilge pump, the bilge pump may not adequately remove bilge water from a deep well because the bilge pump is of a size that cannot be positioned in the deep well. This problem can be solved by adding an additional bilge pump in the well that is smaller than the primary bilge pump. Such an additional bilge pump does not operate at the same times as the primary bilge pump because the additional pump is only required to operate after the primary bilge pump brings the water level down to the well below the primary bilge pump when the primary bilge pump will no longer remove water from the bilge. Also for example, in some watercraft the bilge pump may remove the bilge water too slowly under some conditions such as when a large volume of water rapidly enters the bilge. This problem can be solved by replacing the bilge pump with a bilge pump having a larger capacity or adding a supplemental bilge pump so that the two bilge pumps operate at the same time to more quickly reduce the large volume of bilge water. It also can be desirable to have a back-up bilge pump for use upon failure of the primary bilge pump. Such additional, supplemental, and back-up bilge pumps can be easily provided by original equipment manufacturers but are relatively expensive and time consuming to install under after-market conditions because additional openings must be cut into the hull of the watercraft.

Accordingly, there is a need for an improved bilge pump system having an additional or supplementary bilge pump that is less costly and is relatively simple to install.

SUMMARY OF THE INVENTION

Disclosed herein is a bilge pump system and a valve assembly therefor which overcome at least one of the deficiencies of the prior art. Disclosed is a valve assembly for a bilge pump system having first and second bilge pumps each connected to a hull outlet. The valve assembly comprises, in combination, a valve body having a first inlet port for connection to the first bilge pump, a second inlet port for connection to the second bilge pump, an outlet port for connection to the hull outlet, a first one-way valve operating at the first inlet port, and a second one-way valve operating at the second inlet port. The first one-way valve is configured to allow bilge water to flow in through the first inlet port and out through the outlet port, and to prevent bilge water from flowing in through the second inlet port and out through the first inlet port. The second one-way valve is configured to allow bilge water to flow in through the second inlet port and out through the outlet port, and to prevent bilge water from flowing in through the first inlet port and out through the second inlet port.

Also disclosed is a bilge pump system comprising, in combination, a hull outlet in a wall of a hull, a first bilge pump located in a bilge having an outlet, a second bilge pump located in the bilge and having an outlet, and a valve assembly The valve assembly comprising a valve body having a first inlet port for connection to the first bilge pump, a second inlet port for connection to the second bilge pump, an outlet port for connection to the hull outlet, a first one-way valve operating at the first inlet port, and a second one-way valve operating at the second inlet port. The first one-way valve is configured to allow bilge water to flow in through the first inlet port and out through the outlet port, and to prevent bilge water from flowing in through the second inlet port and out through the first inlet port. The second one-way valve is configured to allow bilge water to flow in through the second inlet port and out through the outlet port, and to prevent bilge water from flowing in through the first inlet port and out through the second inlet port. The system also comprises a first bilge hose connecting the outlet of the first bilge pump with the first inlet port of the valve assembly, a second bilge hose connecting the outlet of the second bilge pump with the second inlet port of the valve assembly, and a third bilge hose connecting the outlet port of the valve assembly with the hull outlet.

From the foregoing disclosure and the following more detailed description of various preferred embodiments it will be apparent to those skilled in the art that the present invention provides a significant advance in the technology and art of bilge pump systems. Particularly significant in this regard is the potential the invention affords for providing a reliable and relatively low cost bilge pump system. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 2A is an enlarged fragmented view of a first one-way valve of the valve assembly of FIG. 2, wherein a ball of the one way valve is seated; and FIG. 2B is an enlarged fragmented view similar to FIG. 2A but wherein a ball of the one-way valve is unseated; and FIG. 3 is an exploded view of a first alternative embodiment of the valve assembly of FIG. 2;

Figure 1:
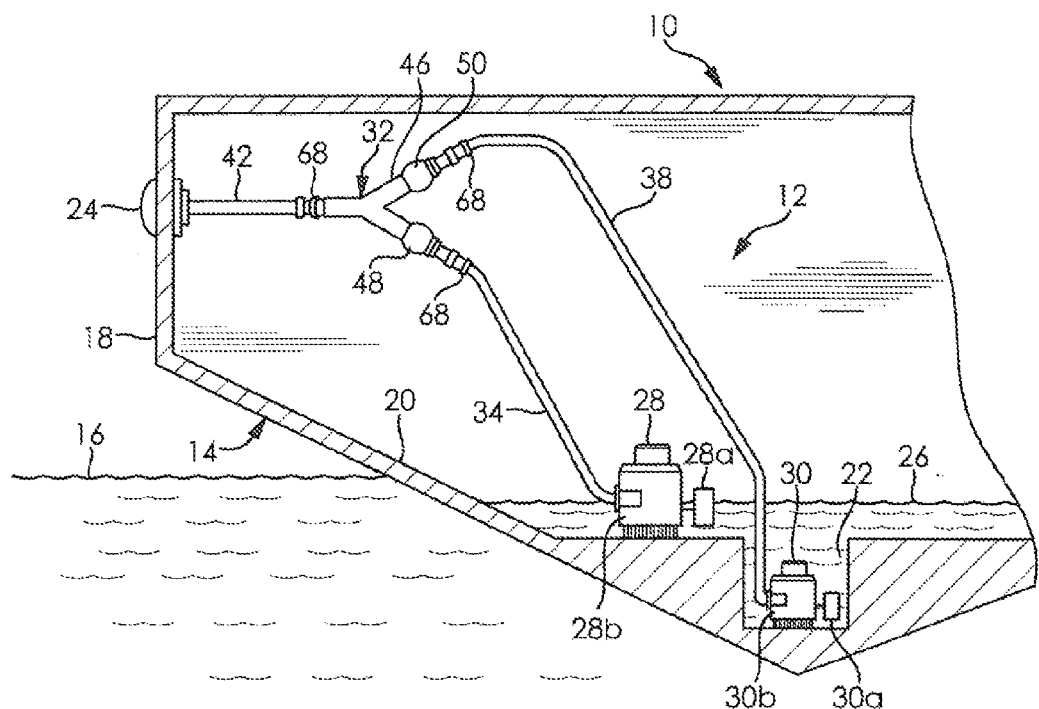
FIG. 1 is a schematic view of a bilge pump system of a watercraft according to the present invention.

It should be understood that the appended drawings are not necessarily to scale, presenting a somewhat simplified representation of various preferred features illustrative of the basic principles of the invention. The specific design features of the bilge pump systems as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the bilge pump switches illustrated in the drawings.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved bilge pump switches disclosed herein. The following detailed discussion of various alternative and preferred embodiments will illustrate the general principles of the invention. Other embodiments suitable for other applications will be apparent to those skilled in the art given the benefit of this disclosure.

Figure 2:
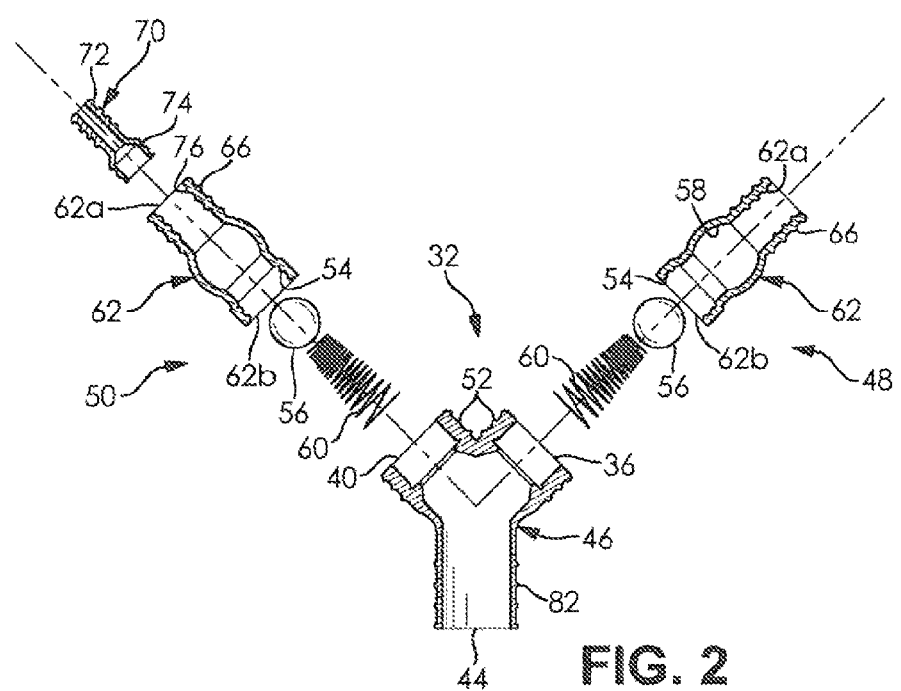
FIG. 2 is an exploded view of a valve assembly of the bilge pump system of FIG. 1.

Referring now to the drawings, FIGS. 1 and 2 illustrate a watercraft 10 with a bilge pump system 12 according to a first embodiment of the present invention. The illustrated watercraft 10 includes a hull 14 configured so that the watercraft 10 floats on a body a water 16. The hull 14 includes a wall 18 that forms a bilge 20. The bilge 20 is the lowest compartment on the watercraft 10 and is below the waterline 16 so that any water that enters the hull 14 accumulates within the bilge 20. The illustrated bilge 20 is located where two sides of the hull 14 meet at a keel. The illustrated bilge 20 includes a small deep well 22 located at the bottom of the bilge 20 where water first starts to accumulate so that the water is not initially spread over the entire bottom of the bilge 20.

The illustrated bilge pump system 12 includes a hull outlet or port 24 in the hull wall 18 and above the waterline 16 so that bilge water 26 can be pumped from the bilge 20 to the body of water 16 through the hull wall 18, a first bilge pump 28 located in the bilge 20 and having an inlet 28a and an outlet 28b, a second bilge pump 30 located within the bilge well 22 and having an inlet 30a and an outlet 30b, and a valve assembly 32 connecting the outlets 28b, 30b of each of the first and second bilge pumps 28, 30 with the hull outlet 24. The illustrated bilge pump system 12 also includes a first bilge hose 34 connecting the outlet 28b of the first bilge pump 28 with a first inlet port 36 of the valve assembly 32, a second bilge hose 38 connecting the outlet 30b of the second bilge pump 30 with a second inlet port 40 of the valve assembly 32, and a third bilge hose 42 connecting an outlet port 44 of the valve assembly 32 with the hull outlet 24. The illustrated hull outlet 24 is a fitting sized and shaped to be secured within an opening in the hull wall 18 and has at least one opening for passage of the bilge water 26 out through the hull wall 18 to the body of water 16. The illustrated hull outlet 24 is also sized and shaped for attachment of an end of the thud bilge hose 42. It is noted that the hull outlet 24 can be of any suitable type.

The illustrated first bilge pump 28 is located within a main portion of the bilge 20 of the relatively large watercraft 10 and has its outlet 28b connected to the first inlet port 36 of the valve assembly 32 by the first bilge hose 34. The illustrated first bilge pump 28 has a relatively large capacity such as about 1000 GPH or more and the first bilge hose 34 has a diameter of about 1⅛ inches. It is noted that the illustrated first bilge pump 28 is too large to fit within the small deep well 22 and when positioned in the main portion of the bilge 20, does not fully pump all of the bilge water 26 from the bilge 20 because bilge water 26 remains in the well 22 which is located below the inlet 28a of the first bilge pump 28. It is noted that the first bilge pump 28 can be of any suitable type but because the bilge water 26 can include oil and/or fuel, the first bilge pump 28 should be of a type that does not generate sparks. It is also noted that the first bilge pump 28 can alternatively have any other suitable capacity and/or can alternatively receive any other suitable diameter of the first bilge hose 34.

The illustrated second bilge pump 30 is located in the small deep well 22 of the bilge 20 and has its outlet 30b connected to the second inlet port 40 of the valve assembly 32 by the second bilge hose 38. The illustrated second bilge pump 30 has a relatively small capacity such as about 800 GPH or less and the illustrated second bilge hose 38 has a diameter of about ¾ inches. It is noted that the illustrated second bilge pump 30 is of a relatively small size so that it fits with the small deep well 22 and can pump essentially all of the bilge water 26 from the small deep well 22. It is noted that the second bilge pump 30 can be of any suitable type but because the bilge water 26 can include oil and/or fuel, the second bilge pump 30 should be of a type that does not generate sparks. It is also noted that the second bilge pump 30 can alternatively have any other suitable capacity and/or can alternatively receive any other suitable diameter of the second bilge hose 38.

The first and second pumps 28, 30 are each operatively connected to a watercraft electrical system to selectively provide electrical power to the first and second bilge pumps 28, 30 in a conventional manner. The first and second bilge pumps 28, 30 can each be provided with depth switches so that the bilge pumps 28, 30 are each automatically energized when the bilge water 26 reaches the depth of the switch. For a suitable depth switch, see U.S. patent application Ser. No. 13/486,475, the disclosure of which is expressly incorporated herein in its entirety. Alternatively, the second bilge pump 30 can be configured to automatically operate only when the first bilge pump 20 is not operating to pump bilge water 26 and the depth switch of the second bilge pump 30 indicates that the bilge water 26 is at a depth that should be pumped. This configuration can improve the life of the second bilge pump 30. Alternatively, the second bilge pump 30 can be configured to operate only when manual switch is activated. This configuration can further improve the life of the second bilge pump 30. It is noted, however, that the first and second bilge pumps 28, 30 can alternatively be configured to activated and deactivated in any other suitable trimmer.

The illustrated valve assembly 32 includes a Y-shaped valve body 46, a first check or one-way valve 48, and a second check or one-way valve 50. The illustrated valve body 46 is Y-shaped but any other suitable shape can alternatively be utilized. The illustrated valve body 46 forms the first inlet port 36 for connection to the first bilge pump 28, the second inlet port 40 for connection to the second bilge pump 30, and the outlet port 44 for connection to the hull outlet 24. The illustrated valve body The check or one-way valves 48, 50 are mechanical devices which allow fluid, in this case liquid in the form of water, to flow through in only one direction. The illustrated first one-way valve 48 operates at the first inlet port 36 and is configured to allow bilge water 26 to flow in through the first inlet port 36 and out through the outlet port 44 when the first bilge pump 28 is operating, to prevent bilge water 26 from flowing in through the outlet port 44 and out through the first inlet port 36 when the first bilge pump 28 is not operating, and to prevent bilge water 26 from flowing in through the second inlet port 40 and back flowing out through the first inlet port 36 to the first bilge pump 28 when the first bilge pump 28 is not operating and the second bilge pump 30 is operating. The illustrated second one-way valve 50 operates at the second inlet port 40 and is configured to allow bilge water 26 to flow in through the second inlet port 40 and out through the outlet port 44 when the second bilge pump 30 is operating, to prevent bilge water 26 from flowing in through the outlet port 44 and out through the second inlet port 40 when the second bilge pump 30 is not operating, and to prevent bilge water 26 from flowing in through the first inlet port 36 and back flowing out through the second inlet port 40 to the second bilge pump 30 when the second bilge pump 30 is not operating and the first bilge pump 28 is operating.

The illustrated valve body 46 is provided with external threads 52 at the first and second inlet ports 36, 40 for securing the first and second on-way valves 48, 50 thereto. The illustrated first and second one-way valves 48, 50 are provided with internal threads 54 sized to cooperate with the external threads 52 of the valve body 46. It is noted that the internal and external threads 54, 52 can be alternatively reversed or the first and second one-way valves 48, 50 can alternatively be secured to the valve body 46 in any other suitable manner. It is also noted that the one-way valves 48, 50 and the valve body 46 can alternatively be integrally formed as a one-piece component.

The illustrated first and second one-way valves 48, 50 are each ball type one-way valve having a valve or closing element 56 in the form of a ball or sphere that is resiliently biased into contact with a valve seat 58 by a spring 60 to close the valve seat 58 and prevent rearward or reverse flow through the one-way valve 48, 50. The illustrated one-way valves 48, 50 each have a valve seat body 62 forming the valve seat 58 along a flow path extending from an inlet port 62a to an outlet port 62b. The valve seat 58 encircles the flow path and faces the outlet port 62b and is sized and shaped to cooperate with the ball 56 to close the flow path when the ball 56 is engaged with the valve seat 58 under the bias of the spring 60 (best seen in FIG. 2A) and to open the flow path when the ball 56 is moved out of engagement with the valve seat 58 by forward fluid flow into the inlet port 62a (best seen in FIG. 2A). Reverse flow through the one-way valve 48, 50 from the outlet port 62b to the inlet port 62a is prevented by the ball 56 seated on the valve seat 58. Forward flow through the one-way valve 48, 50 is permitted when pressure on the inlet side of the ball 56 (often referred to as the upstream pressure or cracking pressure) is high enough to unseat the ball 56 from the valve seat 58 toward the outlet port 62b against the bias of the spring 60.

The illustrated spring 60 is a helical coil compression spring that is generally conical shaped having a large diameter end sized to engage a rearward-facing abutment 64 formed in the Y-shaped valve body 46 and a small diameter end sized to engage the ball 56 to resiliently bias the ball 56 into engagement with the valve seat 58. The one-way valve components are sized and configured so that the one-way valve 48, 50 opens at a predetermined pressure suitable for the attached bilge pump 28, 30 so that operation of the bilge pump 28, 30 provides a pressure that opens the one-way valve 48, 50 but the one-way valve 48, 50 does not inadvertently open when the bilge pump 28, 30 is not operating. It is noted that the spring 60 can alternatively be of any other suitable type and/or the spring 60 can alternatively be configured in any other suitable manner. It is also noted that the one-way valve 48, 50 can alternatively be of any other suitable type such as for example, a diaphragm check valve, a swing check valve, a tilting disc check valve, a stop check valve, a lift check valve, an in-line check valve, a duckbill valve, or the like.

The illustrated inlet port end of the valve seat body 62 are provided with an external barbed connection 66 configured for receiving an end of the flexible bilge hose 34, 38 thereon. The bilge hose 34 is secured the barb connection 66 with at least one but preferably two hose clamps. The illustrated barbed connection 66 sized and shaped to cooperate with a bilge hose 34, 38 having a 1⅛ inch diameter but any other suitable size of connection can alternatively be utilized. It is noted that any other suitable type of hose connection can alternatively be utilized.

The illustrated second-one-way valve 50 is provided with a hose adapter 70. The hose adapter 70 is utilized when a smaller diameter bilge hose 38 is to be connected to the inlet port 62a than the barbed connection 66 of the valve seat body 62 is sized for. The illustrated hose adapter 70 is provided with a barbed connection 72 for receiving the end of the bilge hose 38 having a ¾ inch diameter and an external threaded portion 74 on the outlet side for cooperating with internal threads 76 on the inlet side of the valve seat body 62. It is noted that the hose adapter 70 can alternatively be provided with internal threads that cooperate with external threads of the valve set body 62 or that the hose adapter 70 can alternatively be secured to the valve seat body 62 in any other suitable manner.

The illustrated first bilge hose 34 has a diameter of 1⅛ inches and extends from the outlet 28b of the first bilge pump 28 to the barbed connection 66 of the first one way valve 48 (no hose adapter is needed). The illustrated second bilge hose 38 has a diameter of ¾ inches and extends from the outlet 30b of the second bilge pump 30 to the barbed connection 72 of the hose adapter 70 secured to second one-way valve 50. It is noted that one, two, or no hose adapters 70 may be needed depending on the size of the bilge pumps 28, 30 and thus the size of the bilge hoses 34, 38 connected thereto. It is noted that all of the hose connections are preferably formed in a manner in which each bilge hose 34, 38 is secured with at least one but preferably two hose clamps 68.

FIG. 3 illustrates first variation of the valve assembly 32 in which both the first and second one-way valves 48, 50 must be provided with hose adapters 70a. The hose adapters 70a are selected to match the size of the bilge hose 34, 38 is to be connected to the inlet port 62b. The illustrated hose adapter 70a is provided with a barbed connection 72 for receiving the end of the bilge hose 34, 38 and an internal threaded portion 78 on the outlet side for cooperating with external threads 80 on the inlet side of the valve seat body 62. It is noted that the hose adapters 70a can alternatively be provided with external threads that cooperate with internal threads of the valve set body 62 or that the hose adapters 70a can be secured to the valve seat body 62 in any other suitable manner.

The outlet port 44 of the illustrated Y-shaped valve body 46 is provided with a barbed connection 82 configured for receiving an end of the third bilge hose 42 thereon. The illustrated barbed connection 82 is sized and shaped to receive the illustrated third bilge hose 42 having a 1⅛ inch diameter but any other suitable size can alternatively be utilized. The third bilge hose 42 is secured the barb connection 82 with at least one but preferably two hose clamps 68. It is noted that any other suitable types of bilge hose connections can alternatively be utilized. The illustrated third bilge hose 42 extends from the outlet port 44 of the valve assembly 32 to the hull outlet 24. The first, second and third bilge hoses 34, 38, 42 can be of any suitable type such as, for example, smooth, helix, corrugated, braided and the like and can comprise any suitable material such as, for example, natural or synthetic rubber such as EDPM, vinyl, polyethylene, PVC, and the like.

During operation of the bilge pump system 12, when the first bilge pump 28 is operating and the second bilge pump 30 is not operating, the first bilge pump 28 pulls bilge water 26 located in the bilge 20 into the pump inlet 28a and pushes the bilge water 28 out of the pump outlet 28b and into the first bilge hose 34 to the valve assembly 32. The bilge water 26 passes through the first one-way valve 48 and into the first inlet port 36, through the valve body 46 and out through the outlet port 44. Bilge water 26 is able to pass forwardly through the first one-way valve 48 because the pressure created by the first bilge pump 28 unseats the ball 56 of the first one-way valve 48 from the valve seat 58. The bilge water 26 is prevented from back flowing out of the second inlet port 40 to the second bilge pump 30 by the seated ball 56 of the second one-way valve 50. The bilge water 26 travels from the outlet port 44 into the third bilge hose 42 and through the third bilge hose 42 to the hull outlet 24. The bilge water 26 passes through the hull outlet 24 to the exterior of the hull 14 where it is deposited into the surrounding water 16. The first bilge pump 28 is turned off when the bilge water level is below the depth switch for the first bilge pump 28. When the second bilge pump 30 is operating and the first bilge pump 28 is not operating, the second bilge pump 30 pulls bilge water 26 located in the well 22 into the pump inlet 30a and pushes the bilge water 26 out of the pump outlet 30b and into the second bilge hose 38 to the valve assembly 32. The bilge water 26 passes through the second one-way valve 50 and into the second inlet port 36, through the valve body 46 and out through the outlet port 44. Bilge water 26 is able to pass forwardly through the second one-way valve 50 because the pressure created by the second bilge pump 30 unseats the ball 56 of the second one-way valve 50 from the valve seat 58. The bilge water 26 is prevented from back flowing out of the first inlet port 36 to the first bilge pump 28 by the seated ball 56 of the first one-way valve 48. The bilge water 26 travels from the outlet port 44 into the third bilge hose 42 and through the third bilge hose 42 to the hull outlet 24. The bilge water 26 passes through the hull outlet 24 to the exterior of the hull 14 where it is deposited into the surrounding water 16. The second bilge pump 30 is turned off when the bilge water level is below the depth switch for the second bilge pump 30. When the both the first and second bilge pumps 28, 30 are operating, bilge water 26 flows from each of the bilge pumps 28, 30 and through the valve assembly 32 as described above. Back flow through either of the inlet ports 36, 40 is prevented due to the forward liquid flow through each of the inlet ports 36, 40. When both the first and second bilge pumps 28, 30 are not operating, no bilge water 26 flows from the bilge pumps 28, 30. Back flow through either of the inlet ports 36, 40 is prevented by the seated balls 56 of the one-way valves 48, 50.

Figure 4:
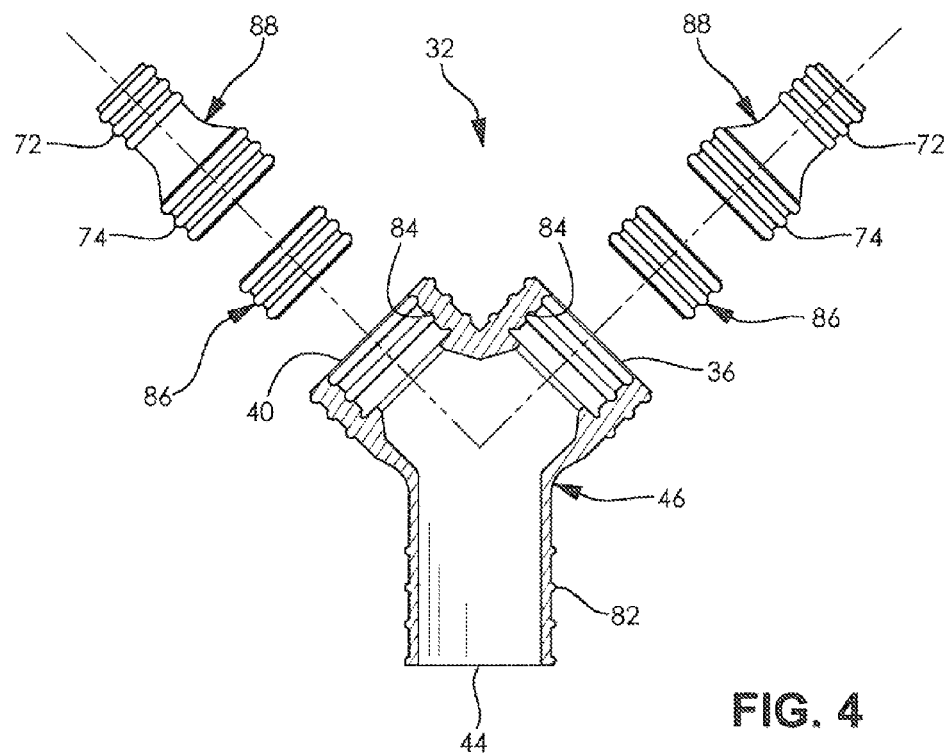
FIG. 4 is an exploded view of a second alternative embodiment of the valve assembly of FIG. 2.

FIG. 4 illustrates a second variation of the valve assembly 32 in which the valve assembly 23 is a modular fitting. The inlet ports 36, 40 are provided with internal threads 84 for thread-in check or one-way valves 86 and hose bibs 88. Multiple sizes of each of the check valves 86 and the hose bibs 88 can be provided in a kit along with the Y-shaped valve body 46 so that the valve assembly 32 can be configured in a plurality of different ways depending on the size of the two bilge pumps 28, 30 being used.

Figure 5:
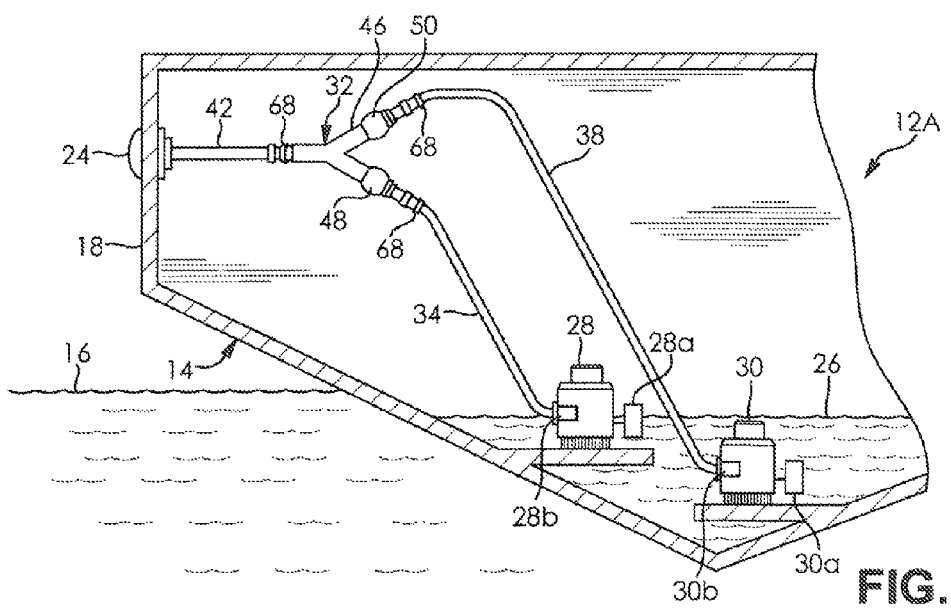
FIG. 5 is a schematic view of another bilge pump system of a watercraft according to the present invention.

FIG. 5 illustrates a bilge pump system 12A according to second embodiment of the present invention. The bilge pump system 12A according to the second embodiment of the invention is substantially the same as the bilge pump system 12 of the first embodiment of the invention described in detail above except that both the first and second bilge pumps 28, 30 are each located in the main portion of the bilge 20 and each bilge pump 28, 30 is a large capacity pump and connected with 1⅛ inch diameter bilge hose so that no hose adapter 70 is needed. Note that the second or supplementary bilge pump 30 is mounted at a second height (higher than the height of the first bilge pump 28) so that initially only the first or primary bilge pump 28 operates. If the bilge water 26 reaches a predetermined height (controlled by the depth switch of the second bilge pump 30), the second bilge pump 30 is activated so that both of the bilge pumps 28, 30 operate to remove bilge water 26 through the single hull opening 24.

It is noted that each of the features and variations of the above disclosed embodiments can be used in any combination and in any combination with each of the features and variations of the other disclosed embodiments.

From the foregoing disclosure it is apparent that the disclosed bilge pump system having two bilge pumps connected to a common hull outlet is reliable, relatively inexpensive, and is relatively simple to install because valve assembly enables the second bilge pump to be added without cutting an additional outlet opening in the hull.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A valve assembly for a bilge pump system having first and second bilge pumps each connected to a hull outlet and each operatively connected to an electrical system to selectively provide electrical power to each of the first and second bilge pumps so that the first and second bilge pumps can be separately energized to pump bilge water, the valve assembly comprising, in combination:

a valve body having a first inlet port for connection to the first bilge pump, a second inlet port for connection to the second bilge pump, and an outlet port for connection to the hull outlet;

a first one-way valve operating at the first inlet port and configured to allow bilge water to flow in through the first inlet port and out through the outlet port, and to prevent bilge water from flowing in through the second inlet port and out though the first inlet port; and a second one-way valve operating at the second inlet port and configured to allow bilge water to flow in through the second inlet port and out through the outlet port, and to prevent bilge water from flowing in through the first inlet port and out though the second inlet port.

2. The valve assembly according to claim 1, wherein the valve body is Y-shaped.

3. The valve assembly according to claim 1, wherein the first and second one-way valves are each ball valves.

4. The valve assembly according to claim 1, wherein the first and second one-way valves are each threaded onto external threads of the valve body.

5. The valve assembly according to claim 1, wherein the first and second one-way valves are each threaded onto internal threads of the valve body.

6. The valve assembly according to claim 1, wherein the first and second inlets ports are each provided with a barbed connection for receiving a bilge hose.

7. The valve assembly according to claim 6, wherein the barbed connection is sized for a 1⅛ inch diameter bilge hose.

8. The valve assembly according to claim 7, further comprising an adapter having barbs for receiving a ¾ inch diameter bilge hose and secured to one of the first and second inlet ports so that a ¾ inch bilge hose can be connected to the respective one of the first and second inlet ports.

9. The valve assembly according to claim 8, wherein the adapter is threaded onto internal threads at the barbed connection.

10. The valve assembly according to claim 8, further comprising another adapter having barbs for receiving a ¾ inch diameter bilge hose and secured to the other one of the first and second inlet ports so that a ¾ inch diameter bilge hose can be connected to each of the first and second inlet ports.

11. A bilge pump system comprising, in combination:
a hull outlet located in a wall of a hull;
a first bilge pump located in a bilge and having an outlet;
a second bilge pump located in the bilge and having an outlet;
wherein the first and second bilge pumps are each operatively connected to an electrical system to selectively provide electrical power to the first and second bilge pumps so that the first and second bilge pumps can be separately energized to pump bilge water from the bilge to the outlets of the first and second bilge pumps;
a valve assembly comprising a valve body having a first inlet port for connection to the first bilge pump, a second inlet port for connection to the second bilge pump, and an outlet port for connection to the hull outlet;

a first one-way valve operating at the first inlet port and configured to allow bilge water to flow in through the first inlet port and out through the outlet port, and to prevent bilge water from flowing in through the second inlet port and out though the first inlet port; and a second one-way valve operating at the second inlet port and configured to allow bilge water flow in through the second inlet port and out through the outlet port, and to prevent bilge water flow in through the first inlet port and out though the second inlet port;

a first bilge hose connecting the outlet of the first bilge pump with the first inlet port of the valve assembly;

a second bilge hose connecting the outlet of the second bilge pump with the second inlet port of the valve assembly; and a third bilge hose connecting the outlet port of the valve assembly with the hull outlet.

12. The valve assembly according to claim 11, wherein the valve body is Y-shaped.

13. The valve assembly according to claim 11, wherein the first and second one-way valves are each ball valves.

14. The valve assembly according to claim 11, wherein the first and second one-way valves are each threaded onto external threads of the valve body.

15. The valve assembly according to claim 11, wherein the first and second one-way valves are each threaded onto internal threads of the valve body.

16. The valve assembly according to claim 11, wherein the first and second inlets ports are each provided with a barbed connection for receiving a bilge hose.

17. The valve assembly according to claim 16, wherein the barbed connection is sized for a 1⅛ inch diameter bilge hose.

18. The valve assembly according to claim 17, further comprising an adapter having barbs for receiving a ¾ inch diameter bilge hose and secured to one of the first and second inlet ports so that a ¾ inch bilge hose can be connected to the respective one of the first and second inlet ports.

19. The valve assembly according to claim 18, wherein the adapter is threaded onto internal threads at the barbed connection.

20. The valve assembly according to claim 18, further comprising another adapter having barbs for receiving a ¾ inch diameter bilge hose and secured to the other one of the first and second inlet ports so that a ¾ inch diameter bilge hose can be connected to each of the first and second inlet ports.

* * * * *